United States Patent [19]

Blomberg et al.

[11] 4,068,904
[45] Jan. 17, 1978

[54] ANTI-LOCKING BRAKE APPARATUS AND METHOD

[76] Inventors: Folke Ivar Blomberg, Duvstigen 4, S-181 40 Lidingo; Jan-Olov Martin Holst, Skogsduvevagen 14, S-75252 Uppsala, both of Sweden

[21] Appl. No.: 657,762

[22] Filed: Feb. 13, 1976

[30] Foreign Application Priority Data

Feb. 19, 1975 Sweden .............................. 7501883

[51] Int. Cl.² .............................................. B60T 13/68
[52] U.S. Cl. .................................... 303/115; 303/116; 303/61
[58] Field of Search .......................... 303/115, 116, 61

[56] References Cited

U.S. PATENT DOCUMENTS

| 2,483,205 | 9/1949 | Jones | 303/61 |
| 3,574,416 | 4/1971 | Skoyles | 303/61 |
| 3,724,914 | 4/1973 | Skoyles | 303/116 |
| 3,774,976 | 11/1973 | Parsons | 303/115 |

FOREIGN PATENT DOCUMENTS

| 1,359,487 | 7/1974 | United Kingdom | 303/116 |

Primary Examiner—Trygve M. Blix
Assistant Examiner—Reinhard J. Eisenzopf
Attorney, Agent, or Firm—Bell, Seltzer, Park & Gibson

[57] ABSTRACT

An apparatus for braking a rotating member which has a fluid pressure actuated brake cylinder for exerting force braking rotation of the member, a reservoir for supplying fluid to the actuated cylinder, a conduit for establishing operative communication between the actuated cylinder and the reservoir, and a sensor for detecting the rate of retardation of rotation of the member and for signalling the occurrence of a rate of retardation in excess of a predetermined rate, and an improvement in such apparatus in which a controllable anti-lock modulator is interposed in the conduit between the reservoir and the actuated cylinder for normally accommodating free flow of fluid between the reservoir and the actuated cylinder through the conduit and the modulator. The modulator is operatively connected to the sensor and responsive thereto for pumping fluid through the conduit in response to a signalled excessive rate of retardation and thereby for releasing braking force otherwise retarding rotation of the member.

24 Claims, 5 Drawing Figures

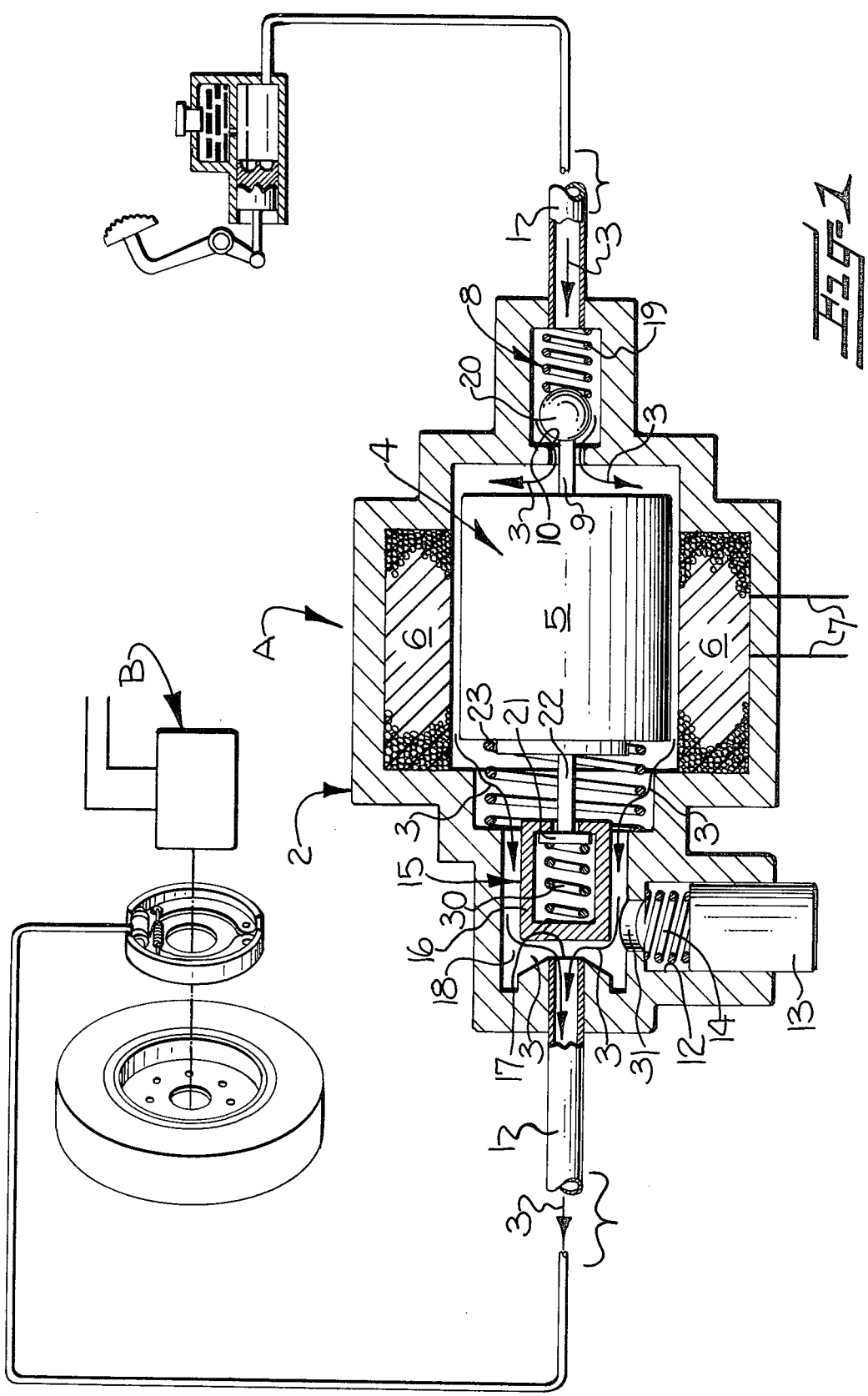

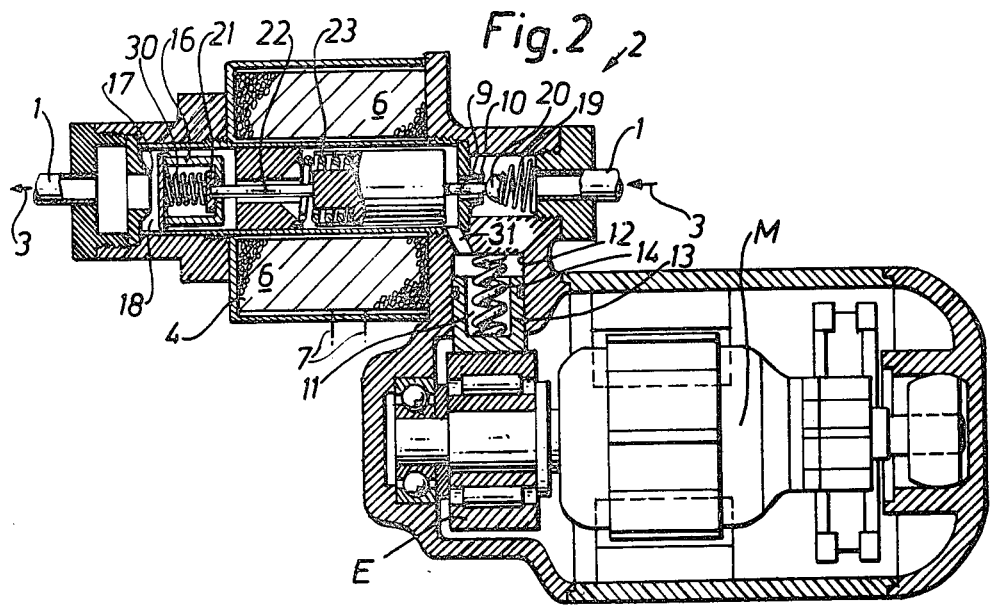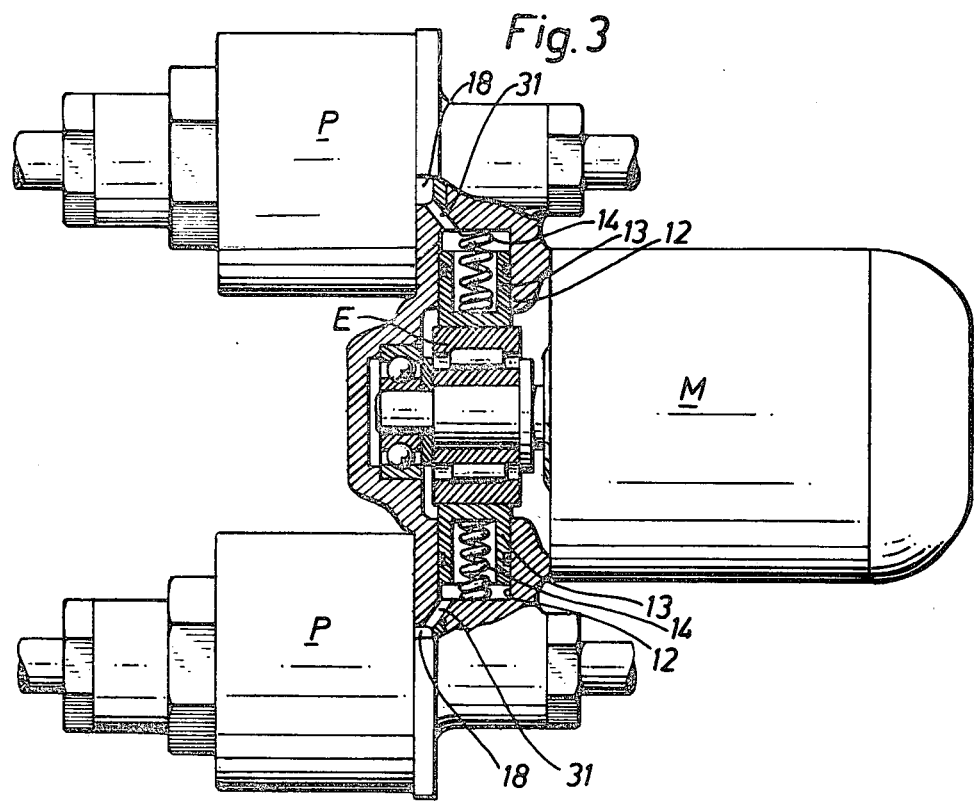

ANTI-LOCKING BRAKE APPARATUS AND METHOD

It has previously been recognized that the application of a braking force for slowing rotation of a rotating member is subject to a phenomenon known as "locking." With particular reference to fluid pressure actuated brakes for slowing the wheel of an automotive vehicle, locking occurs when the rolling friction between the wheel and the road surface is overcome and the wheel slips relative to the road surface. The dangers of such locking are well known, and include loss of steering control and skidding or loss of directional stability.

Successful approaches to overcoming these problems have been proposed heretofore, in the form of apparatus and methods such as those described in U.S. Pat. Nos. RE 28,562 and 3,833,097. The arrangements there shown may be characterized as "one conduit systems" since a single conduit conducts pressurized actuating fluid between a master cylinder and an actuated cylinder by which braking force is exerted. Other approaches to one conduit systems have been proposed, in which the true one conduit approach is modified by providing a separate release or drainage conduit through which fluid may be released or withdrawn from the wheel cylinder or an intermediate point along the single conduit. Other types of proposed anti-locking arrangements for fluid pressure actuated brakes may be characterized as being "two conduit systems." In such arrangements, a supply conduit is provided for normally supplying brake fluid from a master cylinder or other pressure source to an actuated cylinder, while a second conduit (which may be known as a release or a drainage conduit) communicates directly with the actuated cylinder for providing a control function.

As a practical matter, each of these various arrangements suffers from certain deficiencies. One common deficiency with certain systems is encountered in "bleeding" of a braking system. As is generally known to skilled automotive brake mechanics, the purpose of bleeding a fluid pressure actuated brake is to remove from the brake system any compressible gases such as air. The inclusion of any quantity of a compressible gas leads to a "spongy" feel on exertion of braking force by an operator and can lead to failure of the braking function. In systems where hydraulic pressure is generated by a pump, the presence of a compressible gas leads to slow response. The many anti-locking arrangements which provide for relief or drainage conduits require complicated bleeding arrangements and procedures which are difficult for mechanics and operators to follow and which will result in the anti-locking arrangement being inoperative if not observed in full detail. Such difficulties lead to circumstances in which a mechanic having executed a conventional bleeding procedure believes that the brake system is functioning properly while the anit-locking arrangement is in fact not operable because of the presence of air. Such a circumstance presents the further danger that trapped air may suddenly enter and disable the normal braking system.

A further difficulty encountered with both one and two conduit systems as heretofore proposed arises from relatively slow response times and the possibility of either complete loss of braking function or failure to release braking function. Such difficulties may particularly arise where components accomplishing relief or drainage are driven directly by the braked rotating member, which may be subjected to either high or low rates of retardation. By way of example, in case of excessive wheel slip and an exceedingly high rate of retardation such as would occur in braking a vehicle wheel on an icy or oil-covered area, the rotating member may be so rapidly braked to a zero rotational velocity and one hundred percent slip that an anti-locking arrangement driven by the wheel never becomes operational.

Particularly where a driven pump has been used in previously proposed anti-locking arrangement, deficiencies have arisen due to the operating characteristics of the pumping arrangement relied on. First, many such pumping arrangements respond only very slowly to signalled changes in rates of retardation of rotating members. Second, the chances of excessively high pressures damaging the antilocking arrangement or excessively low pressures drawing in amounts of compressible gas or volatizing constituents of the hydraulic fluid used must be recognized and dealt with. Attempts to solve one of these deficiencies quite often only compounds the other, as where yielding driving connections are provided for the pumping drive or no return springs are provided for a pump piston of the like.

It is an object of the present invention to avoid the difficulties and shortcomings of prior one and two conduit systems of anti-locking arrangements for fluid pressure actuated brakes. In realizing this object of the present invention, a brake modulator is proposed in which bleeding of compressible gases is readily accomplished by conventionally applied techniques. Further, the brake modulator of the present invention has the capability of responding quickly to excessive wheel slip or to excessive rates of retardation, irrespective of specific rotational speed of the braked vehicle wheel or rotating member.

Yet a further object of the present invention is the provision of a brake modulator in which first and second valves define therebetween a controlled conduit portion and an expansible chamber is provided in the conduit portion so defined. By coordinating the condition of the valves with variations in volume of the chamber, hydraulic fluid may selectively be permitted to pass freely through the conduit portion or be pumped through the conduit portion in a selected direction, all as described more fully hereinafter.

Some of the objects and advantages of this invention having been set forth, other objects and advantages will appear when taken in conjunction with the accompanying drawings, in which FIG. 1 is an elevation view, partially schematic and partially in section, illustrating a controllable antilocking device installed in accordance with the present invention;

FIG. 2 is a view similar to FIG. 1, illustrating one operating embodiment of the present invention;

FIG. 3 is a plan view, partially in section, of a modified form of the device of FIG. 2.

Figure 4A:
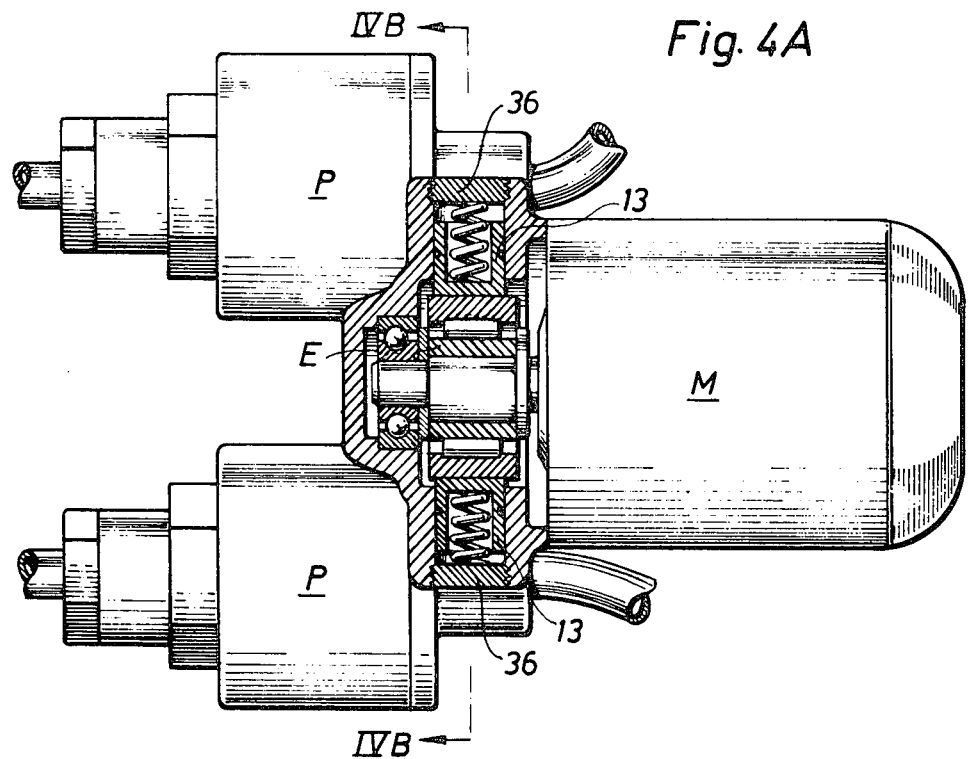
FIG. 4A and 4B are respectively a view similar to FIG. 3 and an end elevation view (partially in section and taken substantially along the line 4B—4B in FIG. 4A) of a modified form of the device of FIG. 3.

While the present invention will be described more fully hereinafter with reference to the accompanying drawings, it is to be understood at the outset of the detailed description of this invention that it is contemplated that various modifications of the invention as described may be made by persons skilled in the appropriate arts. For that reason, the detailed description is to be read broadly, and not as limiting on the scope of this invention.

As illustrated in FIG. 1, a device in accordance with the present invention, generally indicated at A, includes a housing 2 through which pressurized hydraulic fluid normally flows in a normally open flow path indicated by arrows 3. Hydraulic fluid flows from a master cylinder to a wheel cylinder during braking and in a reverse direction during brake modulation as described hereinafter. The housing has first and second conduit coupling means for interposition of the housing means 2 in a conduit 1 conducting such pressurized hydraulic fluid. As so installed in the brake line of a conventional hydraulic fluid brake for an automotive vehicle, the normally open characteristic of the flow path through the housing 2 assures that there is no need for any alteration of the conventional bleeding method for removing compressible gas from the braking system into which the device A in accordance with this invention is incorporated.

Within the housing are first and second valve means indicated generally at 8, 15 in series flow relation with each other and with the conduit 1 for controlling fluid flow through the housing 2. The first and second valve means 8, 15 define therebetween a controlled conduit portion, for purposes to be pointed out more fully hereinafter. Also mounted within the housing 2 is a valve actuator means indicated generally at 4 and operatively coupled with the first and second valve means 8, 15 for normally conditioning the valves for free passage of fluid in either direction through the housing 2. The valve actuator means 4, as described more fully hereinafter, is controllably operable for conditioning the valve means 8, 15 for blocking passage of fluid in one direction through the housing means 2 while still allowing passage of fluid in the other direction. The valves and valve actuator 4 cooperate with a pumping section generally indicated at 11 and having a piston means 13 mounted in a cylinder 12 in the housing means 2. The piston means 13 operatively communicates with the controlled conduit portion defined between the valve means 8, 15 via a passage 31 and is operated (as indicated by a double-headed arrow in FIG. 1) for cyclically expanding and contracting the volume of the controlled conduit portion.

It will be noted that each of the first and second valve means 8, 15 has a selective check valve function. Referring more particularly to the first valve means 8, it will be noted that the valve means includes a ball 20 urged by a spring 19 toward engagement with a seat 10. The ball 20 is normally held away from the seat 10 by a control bar or pin 9 extending from an armature 5 of an electrical solenoid functioning as the valve actuator means 4. As will be brought out more fully hereinafter, the armature 5 moves axially within the housing 2 in response to electrical signals applied to a winding 6 of the valve actuator means 4. As will be appreciated, the spring bias of the ball 20 against the seat 10 allows the first valve means 8 to pass fluid flow in one direction (from left to right in FIG. 1) while blocking fluid flow in the other direction (from right to left in FIG. 1). The second valve means 15 will be noted as having a valve member 16 biased toward engagement with a seat 17 by a spring 30 which provides resilient interconnection between the valve member 16 and an enlarged head 21 of a rod 22 which extends from the armature 5. The second valve means functions in a manner substantially identical to that desscribed with reference to the first valve means.

It is proposed that the brake modulator of FIG. 1 be employed in conjunction with a sensor which emits a signal in the event that anti-locking operation is required. A number of such sensors are described in U.S. Pat. No. 3,833,097 and several variations have been illustrated in FIGS. 6–12 of that patent. Persons knowledgeable in the arts relating to anti-locking brake control systems will be aware of other sensor means which are known to be suitable for detecting wheel slip or the rate of retardation of a braked rotating member and for signalling electrically and otherwise the occurrence of excessive wheel slip or a rate or retardation in excess of a predetermined rate. A selected one of such sensors is, in accordance with the present invention, operatively connected with the rotating member to be controlled by the device of FIG. 1, as indicated generally at B and is electrically connected with the winding 6 to energize the winding in the event that brake modulation is required.

In normal operation, hydraulic fluid may freely flow in both directions in the hydraulic conduit 1 and through the housing means 2 in the flow path indicated by arrows 3. Thus, normal braking action may occur with pressurization of fluid by a master cylinder and resultant actuation of a wheel cylinder. However, when the winding 6 of the valve actuator means 4 is energized in connection with the emission of a signal from a sensor, generated as the result of wheel slip or an excessive rate of retardation of a braked rotating member, the armature 5 is displaced (to the left in FIG. 1) against the action of a return spring 23. Such displacement of the armature 5 results in substantially simultaneous closing of the first and second valve means 8, 15 through the action of the respective biasing springs 19, 30. With such conditioning of the valve means 8, 15 for blocking passage of flow from the master cylinder to the actuated cylinder through the housing means 2, any further increase in pressure buildup in the actuated cylinder is prevented.

By the same signal applied to the winding 6, a suitable motive means driving the piston 13 is actuated, and the piston 13 begins reciprocatory oscillation against the force of a return spring 14. Preferably, as described more fully hereinafter, such movement of the piston 13 results from an eccentric drive by an electrical motor. With cyclical expansion and contraction of the volume of the controlled conduit portion between the valve means 8, 15, pressure in the controlled conduit portion within housing 2 is lowered relative to the pressure in the actuated cylinder, and then increased above the pressure applied from the master cylinder. As a result, hydraulic fluid is pumped away from the actuated cylinder and returned toward the master cylinder.

Two specific advantages of the brake modulator of the present invention, as described to this point, result from the fact that no pumping action will take place if the first and second valve means 8, 15 are not conditioned for check valve operation by the valve actuator means 4, even though the piston 13 should move in its cylinder 12. Since the braking system into which the device of the present invention is inserted is a filled hydraulic system, reciprocating movement of the piston 13 while the flow path for hydraulic fluid is normally open will not adversely affect the function or operation of the rest of the system, and the device will not function as a pump until a response to a signalled excessive rate of retardation is required or in the event of loss of signals to the valve actuator means.

Advantage may be taken of this fact to reduce the interval of time required to respond to sensor signals. By way of example, any one of four sensors provided on a fourwheeled vehicle may be allowed to start piston movement for modulators controlling anti-lock functions for all four wheels and, where appropriate, several or all of the modulators may be driven from a common motive means. Thus, an occurrence of excessive wheel slip at any one of four wheels facilitates more prompt response to similar excessive slip at any other wheel in the group. Alternatively, the piston movement may be started in response to the pressure from the master cylinder rising above a limit value. Further, the reciprocation of the piston 13 need not be deactivated immediately upon restoration of the modulator to the normal open flow path condition. Instead, the restoration of the conduit to the free flow condition assures avoidance of excessive continuance of relaxation of braking effect. Avoidance of continued pumping or selection of the force exerted by the spring 30 will avoid the exertion on the actuated cylinder of a vacuum such as might draw air into the cylinder around the sealing elements of the actuated cylinder.

In order to further assure that undesirable subatmospheric pressures are not induced by the pumping action of a device in accordance with this invention, it is contemplated that a fluid pressure controlled electrical switch may be electrically connected with the winding 6 and operatively communicate with the controlled conduit portion within the housing 2. By means of such a safety switch, set to open an electrical circuit at a predetermined pressure above atmospheric pressure, the piston motive means, the winding 6 or both will be de-energized in the event that pumping operation of the device in accordance with this invention decreases the pressure applied to the actuated cylinder below such a limit level, in which event the pumping effect would cease immediately. As will be appreciated, such a safety switch alternatively may be connected to the conduit 1 intermediate the housing means 2 and the actuated cylinder.

As soon as the brake modulator of this invention has relieved the pressure applied to an actuated cylinder to such an amount that the rate of rotation of the wheel ceases to decrease at an excessive rate and/or wheel slip is no longer excessive, the sensor signal ceases and the coil 6 of the valve actuator means 4 is de-energized. At the same time, the motive means for the pump piston 13 may also be de-energized, except for such embodiments wherein two or more devices use a common motor or pump drive for common control for such a drive. With de-energization of the winding 6, the normal free hydraulic fluid flow through the housing 2 is restored, in that the armature 5 is returned to the normal position (moved to the right in FIG. 1 by the action of the spring 23) and the first and second valve means 8, 15 are conditioned for free passage of fluid.

Referring now more particularly to FIG. 2, an operating embodiment of the device schematically shown in FIG. 1 has there been illustrated and common reference characters have been applied to common features of the apparatus. As will be noted from a comparison of the schematic showing of FIG. 1 with the embodiment illustrated more fully in FIG. 2, the position of the piston 13 of the pumping portion 11 may be varied relative to the winding 6, while still accommodating cyclical expansion and contraction of the volume of the controlled conduit portion defined between the first and second valve means 8, 15. As will be further noted, an electrical motor M driving an eccentric E for moving the piston 13 are illustrated more fully in FIG. 2.

An operating embodiment in which a single electrical motor M provides motive power for more than one device has been illustrated in FIG. 3, where common reference characters are again applied to common elements of the device in accordance with this invention. The arrangement of FIG. 3 is particularly applicable to two circuit systems where parallel fluid pressure conduits run from two master cylinders to conduct pressurized fluid flow to independent actuated cylinders at a common wheel or to different patterns for braking multiple separate rotating members. Such two circuit systems are presently conventional in vehicles such as passenger automobiles and accordingly are known to automotive designers.

Figure 4B:
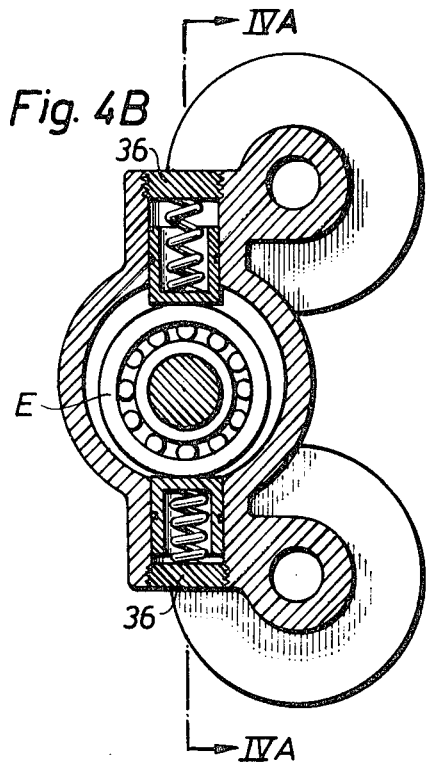

A further modification of the arrangement of FIG. 3 is shown in FIGS. 4A and 4B. In the arrangement of those figures, an offset relationship between the housings 2 for the solenoid windings 6 and the center of rotation of the eccentric E facilitates machining operations during manufacture and also decreases the total dimensions of the assembly. As is especially visible in FIG. 4B, the cylinders 12 are readily accessible for machining, and when the cylinders are finished and the pistons 13 and return springs 14 are mounted, the open outer end of the cylinder may be closed by a threaded plug 36 or the like.

It will be understood that the valve actuator means 4 for the valve means 8 and 15 may take other forms than that described above; that the structure defining the expansible volume controlled conduit portion may similarly vary; and that the motive means may be other than electric. By way of example, the actuator and motive means may both be fluid powered, by pressurized air of hydraulic fluid drawn from available supplies. The controlled conduit portion may employ a diaphragm or the like. It is contemplated that other such variations may be made by the person skilled in the art without departing from the invention here described.

In the drawings and specification, there has been set forth a preferred embodiment of the invention, and although specific terms are employed, they are used in a generic and descriptive sense only and not for purposes of limitation.

That which is claimed is:

1. In apparatus for braking a rotating member which has fluid pressure actuated brake cylinder means for exerting force braking rotation of the member, reservoir means for supplying fluid to the cylinder means, conduit means for establishing operative communication between the cylinder means and the reservoir means, and sensor means for detecting the rate of retardation of rotation thereof and for signalling the occurrence of a rate of retardation in excess of a pedetermined rate, that improvement which comprises brake modulator means interposed in said conduit means between said reservoir means and said cylinder means for normally accommodating free flow of fluid between said reservoir means and said cylinder means through said conduit means and said modulator means, said modulator means being operatively connected to said sensor means and responsive thereto for pumping fluid through said conduit means in one of the directions of toward and away from said cylinder means in response to a signalled excessive rate of retardation and thereby for releasing braking forces otherwise retarding rotation of the member.

2. Apparatus according to claim 1 wherein said modulator means comprises first and second valve means in series flow relation in said conduit means and defining therebetween a controlled conduit portion, valve actuator means operatively coupled to said valve means for normally conditioning said valve means for free flow of fluid therethrough and responsive to said sensor means for conditioning said valve means for flow of fluid in only one direction therethrough in response to a signalled excessive rate of retardation, and expansible chamber means operatively communicating with said controlled conduit portion for intermittently expanding and contracting the volume thereof.

3. Apparatus according to claim 2 further comprising master cylinder means interposed between said reservoir means and said conduit means for pressurizing fluid in said conduit means and thereby transmitting to said cylinder means force for braking rotation of the member and further wherein said expansible chamber means and said valve means cooperate for pumping fluid away from said cylinder means to effect release of braking force.

4. Apparatus according to claim 2 wherein said valve actuator means is a common actuator means operatively coupled to both of said first and second valve means.

5. A brake modulating arrangement for a rotating member comprising sensor means for detecting the rate of retardation of rotation of the rotating member and for signalling the occurrence of a rate of retardation in excess of a predetermined rate, cylinder means for exerting braking force on the rotating member and having piston means for receiving force transmitted by pressurized hydraulic fluid, braking force actuating means for supplying hydraulic fluid under pressure and thereby for effecting braking of the rotating member, conduit means establishing operative communication between said braking force actuating means and said cylinder means for conducting hydraulic fluid flow therebetween, first and second valve means interposed in said conduit means in series flow relation to each other for controlling hydraulic fluid flow through said conduit means and defining between said valve means a controlled conduit portion, expansible chamber means operatively communicating with said controlled conduit portion for controllably cyclically expanding and contracting the volume thereof, and actuator means operatively connected to said sensor means and to said valve means and said expansible chamber means for normally conditioning said valve means to accommodate free flow of hydraulic fluid in either direction through said controlled conduit portion and for responding to a signalled excessive rate of retardation by conditioning said valve means to block passage of hydraulic fluid through said conduit means to said cylinder means and by cyclically expanding and contracting the volume of said controlled conduit portion to pump hydraulic fluid from said cylinder means toward said braking force actuating means and thereby release braking force otherwise retarding rotation of the member.

6. Apparatus according to claim 5 wherein each of said valve means comprises a seat, a valve member for seating on a corresponding seat, and resilient means for biasing a corresponding valve member toward said corresponding seat and thereby for blocking passage of fluid through a corresponding valve means only in one direction while accommodating pumped flow therethrough in the other direction.

7. Apparatus according to claim 6 wherein said valve actuator means is operatively coupled to said biasing means of one of said valve means and is operatively coupled to said valve member of the other of said valve means.

8. Apparatus according to claim 5 wherein said valve actuator means comprises an electrical solenoid coil, armature means mounted for movement relative to said coil and operatively coupled to said valve means, and resilient means biasing said armature means toward a first conditioning position, said armature means moving relative to said coil and to a second conditioning position upon electrical energization of said coil.

9. In apparatus for braking a vehicle wheel which has hydraulic fluid pressure responsive braking means for braking rotation of the wheel, a single hydraulic fluid conduit connected to the braking means, and means operatively communicating with the single conduit for applying therethrough hydraulic fluid pressure for braking the wheel, that improvement which comprises brake modulator means operatively interposed in said single conduit for pumping hydraulic fluid through said single conduit away from said braking means and toward said pressure applying means.

10. Apparatus according to claim 9 wherein said modulator means comprises a pair of spaced-apart, normally open one-way valves defining therebetween an expansible chamber and means for alternately expanding and contracting the volume of said chamber defined between said valves, whereby said valves when closed block fluid flow toward said braking means while allowing fluid flow away from said braking means.

11. Apparatus according to claim 10 further comprising means for closing said valves.

12. Apparatus according to claim 11 further comprising sensor means for signalling occurrences of excessive wheel slip and operatively connected with said valve closing means and said volume expanding and contracting means for initiating operation thereof in response to signalled excessive wheel slip.

13. A brake modulator for use in fluid pressure brake systems and comprising housing means having first and second conduit means for interposition of said housing means in a conduit conducting pressurized fluid, first and second valve means in series flow relation with each other and with said conduit coupling means for controlling fluid flow and defining between said first and second valve means a controlled conduit portion, valve actuator means operatively coupled to said first and second valve means for normally conditioning said valve means for free passage of fluid in either direction through said housing means, said valve actuator means being controllably operable for conditioning said valve means for blocking passage of fluid in one direction through said housing means, and means operatively communicating with said controlled conduit portion for cyclically expanding and contracting the volume thereof and thereby for cooperating with said valve means in pumping fluid in the other direction through said housing means.

14. A device according to claim 13 wherein each of said valve means comprises a seat, a valve member for seating on a corresponding seat, and resilient means for biasing a corresponding valve member toward said corresponding seat and thereby for blocking passage of fluid through a corresponding valve means only in one direction while accommodating pumped flow therethrough in the other direction.

15. A device according to claim 14 wherein said valve actuator means is operatively coupled to said biasing means of one of said valve means and is operatively coupled to said valve member of the other of said valve means.

16. A device according to claim 13 wherein said valve actuator means comprises an electrical solenoid coil, armature means mounted for movement relative to said coil and operatively coupled to said valve means, and resilient means biasing said armature means toward a first conditioning position, said armature means moving relative to said coil and to a second conditioning position upon electrical energization of said coil.

17. A method of avoiding locking of a rotating member braked by force exerted by a fluid pressure actuated cylinder and comprising the steps of normally freely passing fluid between the cylinder and a reservoir through a single conduit which establishes fluid flow communication therebetween and through a controllable anti-locking pump interposed in the single conduit, sensing occurrence of a rate of retardation of the rotating member which exceeds a predetermined rate indicative of a tendency of the rotating member to lock, and responding to a sensed occurrence of an excessive rate of retardation by blocking free passage of fluid in one direction through the pump while pumping fluid through the single conduit in the opposite direction for releasing braking force otherwise retarding rotation of the member.

18. A method according to claim 17 wherein fluid in the conduit is pressurized by a master cylinder and thereby transmits force to the fluid pressure activated cylinder and further wherein the blocking of free passage of fluid and pumping of fluid through the conduit comprise precluding flow of fluid from the master cylinder to the activated cylinder while pumping fluid from the activated cylinder to the master cylinder.

19. In a method of braking an automotive vehicle wheel wherein pressurized hydraulic fluid is supplied from a pressure source and applied through a single conduit to a wheel brake, the improvement comprising closing a pair of spaced-apart, controllable one-way valves in the single conduit and then alternately expanding and contracting the volume of a portion of the single conduit between the two valves and pumping hydraulic fluid the single conduit away from the brake and toward the source for modulating braking of the wheel.

20. A method according to claim 19 further comprising sensing wheel slip, and initiating the step of pumping in response to sensed occurrences of excessive wheel slip.

21. A method according to claim 20 wherein the step of pumping comprises closing a one-way valve in the conduit for blocking fluid flow to the brake while allowing fluid flow away from the brake.

22. A method according to claim 21 wherein the step of pumping comprises closing a pair of spaced-apart one-way valves in the conduit and then alternately expanding and contracting the volume of a portion of the conduit between the two valves.

23. In apparatus for braking a rotating member which has fluid pressure actuated brake cylinder means for exerting force braking rotation of the member, reservoir means for supplying fluid to the cylinder means, single conduit means for establishing operative communication between the cylinder means and the reservoir means, and sensor means for detecting the rate of retardation of rotation thereof and for signalling the occurrence of a rate of retardation in excess of a predetermined rate, that improvement which comprises brake modulator means interposed in said single conduit means between said reservoir means and said cylinder means for normally accommodating free flow of fluid between said reservoir means and said cylinder means through said single conduit means and said modulator means, said modulator means being operatively connected to said sensor means and responsive thereto for pumping fluid through said single conduit means in one of the directions of toward and away from said cylinder means in response to a signalled excessive rate of retardation and thereby for releasing braking forces otherwise retarding rotation of the member.

24. In apparatus for braking a rotating member which has fluid pressure actuated brake cylinder means for exerting force braking rotation of the member, reservoir means for supplying fluid to the cylinder means, conduit means for establishing operative communication between the cylinder means and the reservoir means, and sensor means for detecting the rate of retardation of rotation thereof and for signalling the occurrence of a rate pf retardation in excess of a predetermined rate, that improvement which comprises brake modulator means interposed in said conduit means between said reservoir means and said cylinder means and having first and second valve means in series flow relation in said conduit means and defining therebetween a controlled conduit portion, valve actuator means operatively coupled to said valve means for normally conditioning said valve means for free flow of fluid therethrough, and expansible chamber means operatively communicating with said controlled conduit portion for intermittently expanding and contracting the volume thereof, said modulator means normally accommodating free flow of fluid between said reservoir means and said cylinder means through said conduit means and said modulator means and being operatively connected to said sensor means and responsive thereto for pumping fluid through said conduit means in one of the directions of toward and away from said cylinder means in response to a signalled excessive rate of retardation and thereby for releasing braking forces otherwise retarding rotation of the member.

* * * * *

UNITED STATES PATENT OFFICE
CERTIFICATE OF CORRECTION

Patent No. 4,068,904         Dated January 17, 1978

Inventor(s) Folke Ivar Blomberg et al

It is certified that error appears in the above-identified patent and that said Letters Patent are hereby corrected as shown below:

Column 2, Line 17 delete "of" and insert therefor - or -;

Column 2, Line 52 correct the spelling of "anti-lock-";

Column 2, Line 59 delete "FIG." and insert therefor -FIGS.-;

Column 8, Line 45 following "conduit" insert - coupling -;

Column 9, Line 49 following "fluid" insert - through -;

Column 10, Line 36 delete "pf" and insert therefor - of -.

Signed and Sealed this

Thirteenth Day of June 1978

[SEAL]

Attest:

RUTH C. MASON
Attesting Officer

DONALD W. BANNER
Commissioner of Patents and Trademarks